United States Patent
Wang

(10) Patent No.: US 10,440,583 B2
(45) Date of Patent: Oct. 8, 2019

(54) DATA TRANSMISSION METHOD AND DEVICE

(71) Applicant: Huawei Technologies Co., Ltd., Shenzhen (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 15/521,232

(22) PCT Filed: Oct. 22, 2014

(86) PCT No.: PCT/CN2014/089202
§ 371 (c)(1),
(2) Date: Apr. 21, 2017

(87) PCT Pub. No.: WO2016/061770
PCT Pub. Date: Apr. 28, 2016

(65) Prior Publication Data
US 2017/0318471 A1    Nov. 2, 2017

(51) Int. Cl.
*H04W 16/14*    (2009.01)
*H04L 1/00*    (2006.01)
(Continued)

(52) U.S. Cl.
CPC ........... *H04W 16/14* (2013.01); *H04L 1/0026* (2013.01); *H04L 1/0027* (2013.01);
(Continued)

(58) Field of Classification Search
CPC ............... H04W 16/14; H04W 72/085; H04W 72/0453; H04L 5/0057; H04L 1/0027; H04L 1/0031; H04L 1/0026; H04L 1/0003
See application file for complete search history.

(56) References Cited

U.S. PATENT DOCUMENTS

2008/0268863 A1    10/2008    Pedersen et al.
2008/0310360 A1    12/2008    Heo et al.
(Continued)

FOREIGN PATENT DOCUMENTS

CN    102595596 A    7/2012
CN    102792751 A    11/2012
(Continued)

OTHER PUBLICATIONS

"Required functionalities and design targets of LAA," 3GPP TSG-RAN1 #78bis, Ljubljana, Slovenia, R1-143827, 3rd Generation Partnership Project, Valbonne, France (Oct. 6-10, 2014).
(Continued)

*Primary Examiner* — Thai Nguyen
(74) *Attorney, Agent, or Firm* — Leydig, Voit & Mayer, Ltd.

(57) ABSTRACT

A data transmission method and a device are disclosed and relate to the field of communications technologies, so that a CSI status feedback mechanism suitable for an LTE-U system can be provided. The method includes: detecting, by a first device, data that is transmitted by a second device on an unlicensed carrier; and sending, by the first device, channel state information CSI to the second device on an $N^{th}$ time resource that is after the first device starts to receive the data that is transmitted by the second device on the unlicensed carrier, where N is a positive integer less than 4. The method and the device are used for data transmission.

15 Claims, 4 Drawing Sheets

---

A second device receives, on an $N^{th}$ time resource that is after the second device starts to transmit data to a first device on an unlicensed carrier, channel state information CSI sent by the first device — 201

The second device sends the data to the first device according to the CSI — 202

(51) Int. Cl.
*H04L 5/00* (2006.01)
*H04W 72/04* (2009.01)
*H04W 72/08* (2009.01)

(52) U.S. Cl.
CPC .......... *H04L 1/0031* (2013.01); *H04L 5/0057* (2013.01); *H04W 72/0453* (2013.01); *H04W 72/085* (2013.01); *H04L 1/0003* (2013.01)

(56) References Cited

U.S. PATENT DOCUMENTS

| | | | |
|---|---|---|---|
| 2012/0063383 | A1 | 3/2012 | Barbieri et al. |
| 2013/0058282 | A1 | 3/2013 | Miki et al. |
| 2014/0112289 | A1 | 4/2014 | Kim et al. |
| 2014/0204807 | A1 | 7/2014 | Li et al. |
| 2015/0146557 | A1 | 5/2015 | Pan et al. |
| 2015/0172950 | A1* | 6/2015 | Chen ................ H04W 16/14 370/252 |
| 2015/0181453 | A1 | 6/2015 | Chen et al. |
| 2015/0264694 | A1 | 9/2015 | Nagata et al. |
| 2016/0330630 | A1* | 11/2016 | Yoo .................. H04L 1/0003 |
| 2017/0215179 | A1* | 7/2017 | Choi ................ H04W 72/0413 |

FOREIGN PATENT DOCUMENTS

| | | |
|---|---|---|
| CN | 103051413 A | 4/2013 |
| CN | 103944668 A | 7/2014 |
| CN | 105830486 A | 8/2016 |
| EP | 2384074 A1 | 11/2011 |
| JP | 2009212597 A | 9/2009 |
| JP | 2014075676 A | 4/2014 |
| JP | 2015521432 A | 7/2015 |
| JP | 2017500811 A | 1/2017 |
| WO | 2015094611 A1 | 6/2015 |

OTHER PUBLICATIONS

"CQI reporting at activation," 3GPP TSG-RAN WG2 Meeting #72bis, Dublin, Ireland, R2-110382, 3rd Generation Partnership Project, Valbonne, France (Jan. 17-21, 2011).

Kamerman et al., "WaveLAN-II: A High-Performance Wireless LAN for the Unlicensed Band," Bells Labs Technical Journal, vol. 2, No. 3, pp. 118-133 (Jul. 1, 1997).

"$3^{rd}$ Generation Partnership Project; Technical Specification Group Radio Access Network; Evolved Universal Terrestrial Radio Access (E-UTRA); Physical layer procedures (Release 12)," 3GPP TS 36.213, V12.3.0, pp. 1-212 $3^{rd}$ Generation Partnership Project, Valbonne, France (Sep. 2014).

QUALCOMM Incorporated U.S. Appl. No. 61/917,997, dated Dec. 19, 2013.

JP 2017-522132, Office Action, dated Aug. 6, 2018.

* cited by examiner

DATA TRANSMISSION METHOD AND DEVICE

CROSS REFERENCE TO RELATED APPLICATIONS

This application is a national stage of International Application No. PCT/CN2014/089202, filed on Oct. 22, 2014, which is hereby incorporated by reference in its entirety.

TECHNICAL FIELD

Embodiments of the present invention relate to the field of communications technologies, and in particular, to a data transmission method and a device.

BACKGROUND

In a Long Term Evolution (LTE) in unlicensed spectrum (LTE-U) system, a base station uses a channel resource according to a listen before talk (LBT) rule. LBT is a carrier sense multiple access (CSMA) technology. In a process in which the base station sends data to user equipment by using a physical downlink shared channel (PDSCH), the base station needs to obtain channel state information (CSI) fed back by the user equipment. In the prior art, a licensed spectrum is used in an LTE system for a long time, and CSI is mainly fed back in a periodic or aperiodic manner during use of the licensed spectrum.

An aperiodic CSI feedback is triggered by using uplink signaling. In a data sending process of a base station, the base station controls, by using a CSI request report, user equipment to feed back CSI in uplink signaling, and a CSI feedback process has at least a 10-ms delay. A periodic CSI feedback is configured by using higher layer signaling, and this requires user equipment to initiate one CSI feedback to a base station at a particular time interval. However, in the LTE-U system, unlicensed spectrum is used at random. Therefore, if a CSI feedback mechanism in the LTE system is directly used in the LTE-U system, because the CSI feedback process has at least a 10-ms delay during the aperiodic CSI feedback, a real-time feedback of a CSI status cannot be ensured; and during the periodic CSI feedback, the CSI feedback causes signaling overheads when the base station has no data to be sent, thereby causing a resource waste.

In conclusion, no CSI status feedback mechanism suitable for the LTE-U system can be provided in the prior art.

SUMMARY

Embodiments of the present invention provide a data transmission method and a device, so that a CSI status feedback mechanism suitable for an LTE-U system can be provided.

According to a first aspect, a data transmission method is provided, including:

detecting, by a first device, data that is transmitted by a second device on an unlicensed carrier; and sending, by the first device, channel state information CSI to the second device on an $N^{th}$ time resource that is after the first device starts to receive the data that is transmitted by the second device on the unlicensed carrier, where N is a positive integer less than 4.

With reference to the first aspect, in a first possible implementation manner, N is 1 or 2.

With reference to the first aspect, in a second possible implementation manner, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

With reference to the second possible implementation manner of the first aspect, in a third possible implementation manner, differences between their respective maximum signal-to-noise ratios and minimum signal-to-noise ratios of all the multiple signal-to-noise ratio ranges are equal.

With reference to the second or the third possible implementation manner of the first aspect, in a fourth possible implementation manner, the multiple signal-to-noise ratio ranges are: [−6 dB, 0 dB], [1 dB, 7 dB], [8 dB, 14 dB], and [15 dB, 21 dB]; or the multiple signal-to-noise ratio ranges are: [−6 dB, 3 dB], [3 dB, 12 dB], and [12 dB, 21 dB]; or the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

With reference to the second possible implementation manner of the first aspect, in a fifth possible implementation manner, the modulation scheme indicator includes an indicator of any one of: quadrature phase shift keying QPSK, 16 quadrature amplitude modulation 16QAM, 64 quadrature amplitude modulation 64QAM, or 256 quadrature amplitude modulation 256QAM.

With reference to the first aspect or any one of the possible implementation manners of the first aspect, in a sixth possible implementation manner, the first device is a base station or user equipment; or the second device is a base station or user equipment.

According to a second aspect, a data transmission method is provided, including:

receiving, by a second device on an $N^{th}$ time resource that is after the second device starts to transmit data to a first device on an unlicensed carrier, channel state information CSI sent by the first device, where N is a positive integer less than 4; and sending, by the second device, the data to the first device according to the CSI.

With reference to the second aspect, in a first possible implementation manner, N is 1 or 2.

With reference to the second aspect, in a second possible implementation manner, before the sending, by the second device, the data to the first device according to the CSI, the method further includes:

averagely selecting, by the second device, K signal-to-noise ratios in a target signal-to-noise ratio range, where K is a positive integer; and sending, by the second device, the data to the first device according to K modulation and coding schemes MCS that correspond to the K signal-to-noise ratios.

With reference to the second aspect, in a third possible implementation manner, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

With reference to the third possible implementation manner of the second aspect, in a fourth possible implementation manner, the CSI is a signal-to-noise ratio range indicator; and the sending, by the second device, the data to the first device according to the CSI includes: selecting, by the second device according to a signal-to-noise ratio range indicated by the signal-to-noise ratio range indicator, an MCS that corresponds to a maximum signal-to-noise ratio in the signal-to-noise ratio range, and sending the data to the first device according to the MCS.

With reference to the fourth possible implementation manner of the second aspect, in a fifth possible implementation manner, the selecting, by the second device according to a signal-to-noise ratio range indicated by the signal-to-noise ratio range indicator, an MCS that corresponds to a maximum signal-to-noise ratio in the signal-to-noise ratio range, and sending the data to the first device according to the MCS includes:

selecting, by the second device according to the signal-to-noise ratio range indicated by the signal-to-noise ratio range indicator, the MCS that corresponds to the maximum signal-to-noise ratio in the signal-to-noise ratio range, and continuously sending the data to the first device according to the MCS for M times, where M is a positive integer.

With reference to the second aspect or any one of the possible implementation manners of the second aspect, in a sixth possible implementation manner, the first device is a base station or user equipment; or the second device is a base station or user equipment.

According to a third aspect, user equipment is provided, including:

a detection unit, configured to detect data that is transmitted by a second device on an unlicensed carrier; and a sending unit, configured to send channel state information CSI to the second device on an $N^{th}$ time resource that is after the detection unit detects that the first device starts to receive the data that is transmitted by the second device on the unlicensed carrier, where N is a positive integer less than 4.

With reference to the third aspect, in a first possible implementation manner, N is 1 or 2.

With reference to the third aspect, in a second possible implementation manner, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

With reference to the second possible implementation manner of the third aspect, in a third possible implementation manner, differences between their respective maximum signal-to-noise ratios and minimum signal-to-noise ratios of all the multiple signal-to-noise ratio ranges are equal.

With reference to the second or the third possible implementation manner of the third aspect, in a fourth possible implementation manner, the multiple signal-to-noise ratio ranges are: [−6 dB, 0 dB], [1 dB, 7 dB], [8 dB, 14 dB], and [15 dB, 21 dB]; or the multiple signal-to-noise ratio ranges are: [−6 dB, 3 dB], [3 dB, 12 dB], and [12 dB, 21 dB]; or the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

With reference to the second possible implementation manner of the third aspect, in a fifth possible implementation manner, the modulation scheme indicator includes an indicator of any one of: quadrature phase shift keying QPSK, 16 quadrature amplitude modulation 16QAM, 64 quadrature amplitude modulation 64QAM, or 256 quadrature amplitude modulation 256QAM.

With reference to the third aspect or any one of the possible implementation manners of the third aspect, in a sixth possible implementation manner, the first device is a base station or user equipment; or the second device is a base station or user equipment.

According to a fourth aspect, a base station is provided, including:

a receiving unit, configured to receive, on an $N^{th}$ time resource that is after the second device starts to transmit data to a first device on an unlicensed carrier, channel state information CSI sent by the first device, where N is a positive integer less than 4; and a sending unit, configured to send the data to the first device according to the CSI received by the receiving unit.

With reference to the fourth aspect, in a first possible implementation manner, N is 1 or 2.

With reference to the fourth aspect, in a second possible implementation manner, the sending unit is further configured to: averagely select K signal-to-noise ratios in a target signal-to-noise ratio range, where K is a positive integer; and send the data to the first device according to K modulation and coding schemes MCS that correspond to the K signal-to-noise ratios.

With reference to the fourth aspect, in a third possible implementation manner, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

With reference to the third possible implementation manner of the fourth aspect, in a fourth possible implementation manner, the CSI is a signal-to-noise ratio range indicator; and the sending unit is specifically configured to select, according to a signal-to-noise ratio range indicated by the signal-to-noise ratio range indicator, an MCS that corresponds to a maximum signal-to-noise ratio in the signal-to-noise ratio range, and send the data to the first device according to the MCS.

With reference to the fourth possible implementation manner of the fourth aspect, in a fifth possible implementation manner, the sending unit is specifically configured to select, according to the signal-to-noise ratio range indicated by the signal-to-noise ratio range indicator, the MCS that corresponds to the maximum signal-to-noise ratio in the signal-to-noise ratio range, and continuously send the data to the first device according to the MCS for M times, where M is a positive integer.

With reference to the fourth aspect or any one of the possible implementation manners of the fourth aspect, in a sixth possible implementation manner, the first device is a base station or user equipment; or the second device is a base station or user equipment.

According to a fifth aspect, a first device is provided, including: a transmitter, a receiver, a processor, and a bus, where the transmitter, the receiver, and the processor are connected by using the bus to implement mutual communication;

the processor is configured to detect data that is transmitted by a second device on an unlicensed carrier; and the transmitter is configured to send channel state information CSI to the second device on an $N^{th}$ time resource that is after the processor detects that the receiver starts to receive the data that is transmitted by the second device on the unlicensed carrier.

With reference to the fifth aspect, in a first possible implementation manner, N is 1 or 2.

With reference to the fifth aspect, in a second possible implementation manner, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

With reference to the second possible implementation manner of the fifth aspect, in a third possible implementation manner, differences between their respective maximum signal-to-noise ratios and minimum signal-to-noise ratios of all the multiple signal-to-noise ratio ranges are equal.

With reference to the second or the third possible implementation manner of the fifth aspect, in a fourth possible implementation manner, the multiple signal-to-noise ratio ranges are: [−6 dB, 0 dB], [1 dB, 7 dB], [8 dB, 14 dB], and [15 dB, 21 dB]; or the multiple signal-to-noise ratio ranges are: [−6 dB, 3 dB], [3 dB, 12 dB], and [12 dB, 21 dB]; or the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

With reference to the second possible implementation manner of the fifth aspect, in a fifth possible implementation manner, the modulation scheme indicator includes an indicator of any one of: quadrature phase shift keying QPSK, 16 quadrature amplitude modulation 16QAM, 64 quadrature amplitude modulation 64QAM, or 256 quadrature amplitude modulation 256QAM.

With reference to the fifth aspect or any one of the possible implementation manners of the fifth aspect, in a sixth possible implementation manner, the first device is a base station or user equipment; or the second device is a base station or user equipment.

According to a sixth aspect, a second device is provided, including: a transmitter, a receiver, and a bus, where the transmitter and the receiver are connected by using the bus to implement mutual communication;

the receiver is configured to receive, on an $N^{th}$ time resource that is after the transmitter starts to transmit data to a first device on an unlicensed carrier, channel state information CSI sent by the first device, where N is a positive integer less than 4; and the transmitter is configured to send the data to the first device according to the CSI received by the receiver.

With reference to the sixth aspect, in a first possible implementation manner, N is 1 or 2.

With reference to the sixth aspect, in a second possible implementation manner, the base station further includes a processor connected to the bus;

the processor is configured to averagely select K signal-to-noise ratios in a target signal-to-noise ratio range, where K is a positive integer; and the transmitter is specifically configured to send the data to the first device according to K modulation and coding schemes MCS that correspond to the K signal-to-noise ratios selected by the processor.

With reference to the sixth aspect, in a third possible implementation manner, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

With reference to the third possible implementation manner of the sixth aspect, in a fourth possible implementation manner, the CSI is a signal-to-noise ratio range indicator; and the transmitter is specifically configured to select, according to a signal-to-noise ratio range indicated by the signal-to-noise ratio range indicator, an MCS that corresponds to a maximum signal-to-noise ratio in the signal-to-noise ratio range, and send the data to the first device according to the MCS.

With reference to the fourth possible implementation manner of the sixth aspect, in a fifth possible implementation manner, the transmitter is further specifically configured to select, according to the signal-to-noise ratio range indicated by the signal-to-noise ratio range indicator, the MCS that corresponds to the maximum signal-to-noise ratio in the signal-to-noise ratio range, and continuously send the data to the first device according to the MCS for M times, where M is a positive integer.

With reference to the sixth aspect or any one of the possible implementation manners of the sixth aspect, in a sixth possible implementation manner, the first device is a base station or user equipment; or the second device is a base station or user equipment.

In the embodiments of the present invention, a first device detects data that is transmitted by a second device on an unlicensed carrier. The first device sends channel state information CSI to the second device on an $N^{th}$ time resource that is after the first device starts to receive the data that is transmitted by the second device on the unlicensed carrier, so that the second device sends the data to the first device according to the CSI fed back by the first device. This avoids signaling overheads of periodically sending the CSI by the first device, and can implement a real-time feedback of a CSI status.

BRIEF DESCRIPTION OF DRAWINGS

To describe the technical solutions in the embodiments of the present invention more clearly, the following briefly introduces the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Multiple embodiments are described with reference to the accompany drawings. In the following description, for ease of explanation, many specific details are provided to facilitate comprehensive understanding of one or more embodiments. However, the embodiments may also be implemented without using certain specific details. In other examples, all other embodiments obtained by a person of ordinary skill in the art without creative efforts shall fall within the protection scope of the present invention.

User equipment (UE) provided in the embodiments of the present invention may be a cellular phone, a cordless phone, a Session Initiation Protocol (SIP) phone, a wireless local loop (WLL) station, a personal digital assistant (PDA), a handheld device having a wireless communication function, an in-vehicle device, a wearable device, a computing device, or another processing device connected to a wireless modem.

A base station provided in the embodiments of the present invention may be a device that communicates with the wireless terminal over an air interface in an access network by using one or more sectors. The base station may be configured to mutually convert a received over-the-air frame and an Internet Protocol (IP) packet and serve as a router between the user equipment and a rest portion of the access network, where the rest portion of the access network may include an IP network. The base station may coordinate attribute management of the air interface. The base station may be a base transceiver station (BTS) in Global System for Mobile Communications (GSM) or Code Division Multiple Access (CDMA), or may be a base station (BS) in Wideband Code Division Multiple Access (WCDMA), or may be an evolved Node B (evolutional Node B, NodeB or eNB or e-NodeB) in Long Term Evolution (LTE), or may be, for example, a macro base station or a micro base station in a cellular radio communications system. This is not limited in the embodiments of the present invention.

Terms "first" and "second" are used only for a purpose of description, and shall not be construed as indicating or implying relative importance or implying a quantity of indicated technical features. Therefore, a feature restricted by "first" or "second" may explicitly indicate or implicitly include one or more such features. The "first" and "second" in the following embodiments are only used for distinction, for example, a first device and a second device.

Figure 1:
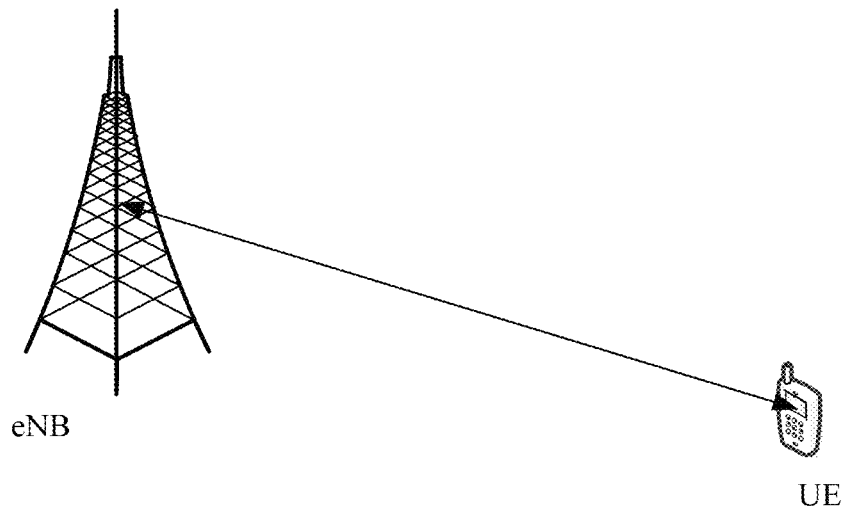
FIG. 1 is a schematic structural diagram of a wireless communications system according to an embodiment of the present invention.

The embodiments of the present invention are used for a wireless communications system shown in FIG. 1, including a first device and a second device. The first device may be a base station or user equipment; and the second device may be a base station or user equipment. In FIG. 1, description is made by using an example in which the second device is an evolved Node B (Evolutional Node B, eNB or eNodeB) in an LTE-U system and the first device is a user equipment that is served by the evolved Node B in the LTE-U system. The base station and the user equipment perform information exchange.

Figure 2:
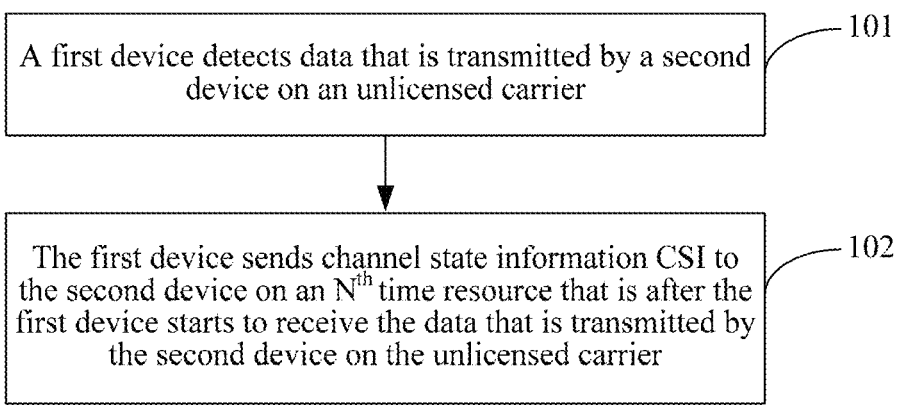
FIG. 2 is a schematic flowchart of a data transmission method according to an embodiment of the present invention.

Specifically, an embodiment of the present invention provides a data transmission method. Referring to FIG. 2, the following steps are included on a first device side.

101: A first device detects data that is transmitted by a second device on an unlicensed carrier.

102: The first device sends channel state information CSI to the second device on an $N^{th}$ time resource that is after the first device starts to receive the data that is transmitted by the second device on the unlicensed carrier, where N is a positive integer less than 4.

It should be noted that when the first device is a user equipment and the second device is a base station, the base station transmits data on a physical downlink shared channel (PDSCH), and transmits control signaling on a physical downlink control channel (PDCCH). Therefore, the user equipment detects and receives, by using the PDSCH, the data transmitted by the base station. Likewise, when the second device is a user equipment and the first device is a base station, the base station detects and receives, by using a physical uplink shared channel (PUSCH), data transmitted by the user equipment.

In step 102, the time resource may be a timeslot, a subframe, or the like. For example, using the subframe as an example, if the first device starts to receive, in a first subframe, the data sent by the second device, the first device sends the channel state information CSI to the second device after a start moment of the first subframe. To implement a real-time CSI feedback, it may be specified herein that the first device sends the channel state information CSI to the second device, at the latest, before the first device sends feedback information of the received data to the second device. For example, if the first device sends the feedback information of the received data in a second subframe, where the second subframe is later than the first subframe, step 102 is specifically: sending, by the first device, the channel state information CSI to the second device at a time between the start moment of the first subframe and an end moment of the second subframe.

The CSI in step 102 may be specifically a channel quality indicator (CQI).

In foregoing embodiment, a first device detects data that is transmitted by a second device on an unlicensed carrier. The first device sends channel state information CSI to the second device on an $N^{th}$ time resource that is after the first device starts to receive the data that is transmitted by the second device on the unlicensed carrier, so that the second device sends the data to the first device according to the CSI fed back by the first device. This avoids signaling overheads of periodically sending the CSI by the first device, and can implement a real-time feedback of a CSI status.

Figure 3:
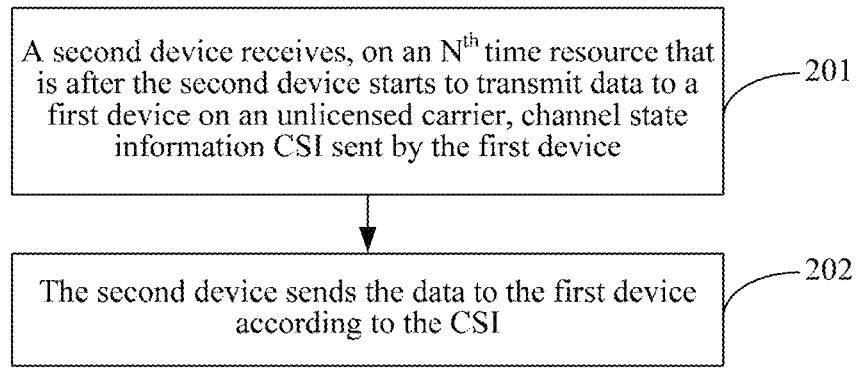
FIG. 3 is a schematic flowchart of a data transmission method according to another embodiment of the present invention.

An embodiment of the present invention provides a data transmission method. Referring to FIG. 3, the following steps are included on a second device side.

201: A second device receives, on an $N^{th}$ time resource that is after the second device starts to transmit data to a first device on an unlicensed carrier, channel state information CSI sent by the first device, where N is a positive integer less than 4.

The time resource in step 201 includes a timeslot, or a subframe, or the like.

202: The second device sends the data to the first device according to the CSI.

Step 202 is specifically: sending, by a base station, the data to a user equipment on a PDSCH according to the CSI, or sending, by a user equipment, the data to a base station on a PUSCH according to the CSI.

In foregoing embodiment, a second device receives, on an $N^{th}$ time resource that is after the second device starts to transmit data to a first device on an unlicensed carrier, channel state information CSI sent by the first device, and sends the data to the first device according to the CSI. This avoids signaling overheads of periodically sending the CSI by the first device, and can implement a real-time feedback of a CSI status.

For example, to implement a real-time feedback of a CSI status, N is 1 or 2 in step 102 and step 201.

Figure 4:
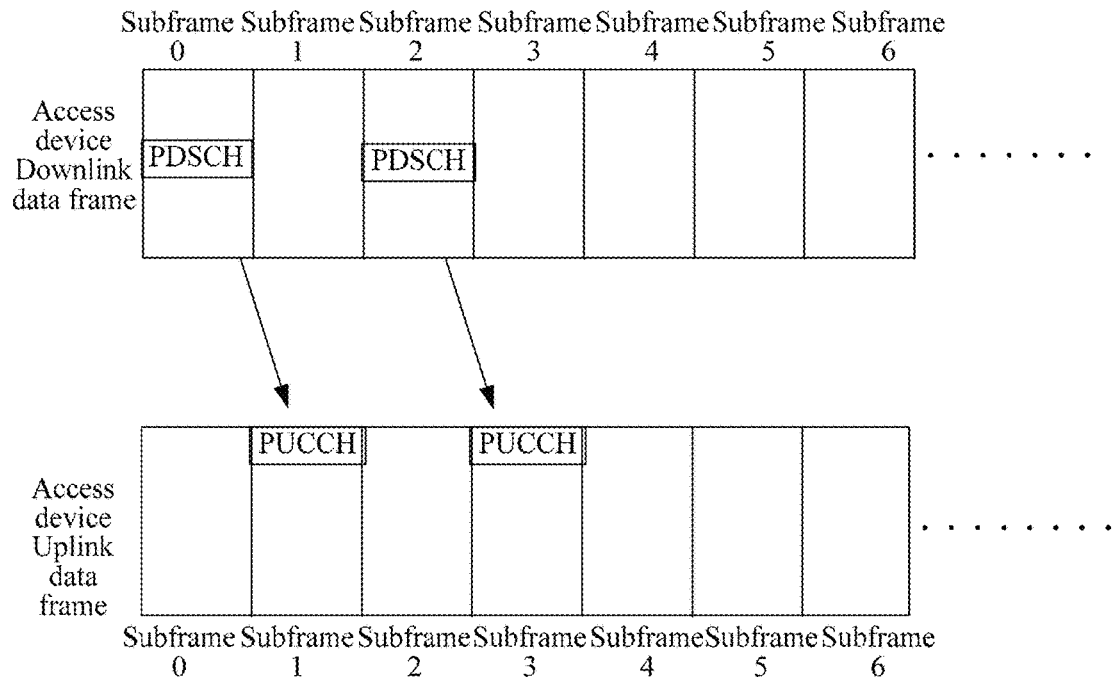
FIG. 4 is a schematic structural diagram of a frame in a data transmission method according to an embodiment of the present invention.
Figure 5:
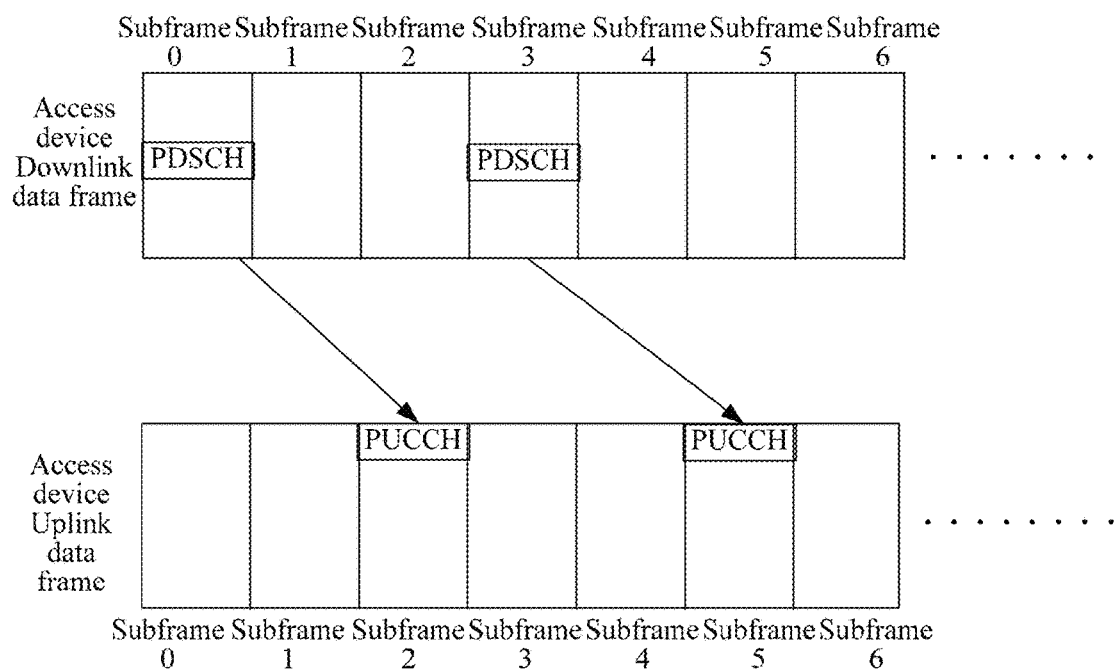
FIG. 5 is a schematic structural diagram of a frame in a data transmission method according to another embodiment of the present invention.
Figure 6:
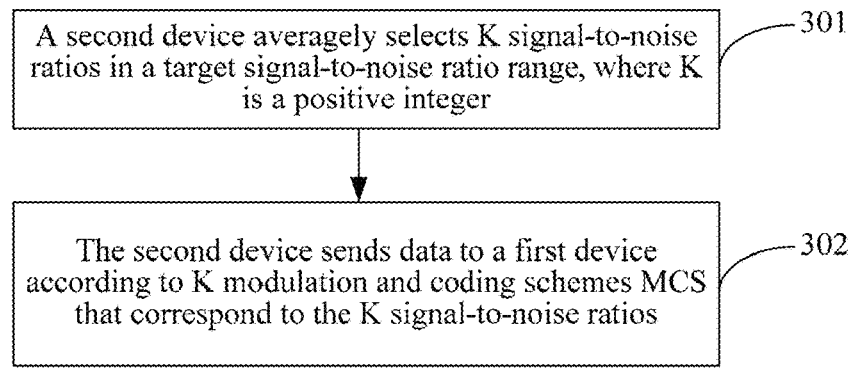
FIG. 6 is a schematic flowchart of a data transmission method according to still another embodiment of the present invention.

Referring to FIG. 4, description is made by using an example in which the second device is a base station in an LTE-U system and the first device is a user equipment that is served by the LTE-U base station. When N=1, the LTE-U base station transmits data to the user equipment on a PDSCH of a first subframe: subframe 0. After receiving the data in the subframe 0, the user equipment feeds back CSI on a physical uplink control channel (PUCCH) of a second subframe: subframe 1. Alternatively, referring to FIG. 5, when N=2, the LTE-U base station sends data to the user equipment on a PDSCH of a first subframe: subframe 0. After receiving the data in the subframe 0, the user equipment feeds back CSI on a physical uplink control channel (PUCCH) of a third subframe: subframe 2.

Optionally, the CSI sent by the second device includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

Further, differences between their respective maximum signal-to-noise ratios and minimum signal-to-noise ratios of all the multiple signal-to-noise ratio ranges are equal. The multiple signal-to-noise ratio ranges are obtained by dividing a target signal-to-noise ratio range, and the target signal-to-noise ratio range is a channel signal-to-noise ratio range that is needed by the first device and the second device for data transmission.

For example, when a channel signal-to-noise ratio range for data transmission in the LTE-U system belongs to [−6 dB, 21 dB], the foregoing multiple signal-to-noise ratio ranges include the following four signal-to-noise ratio ranges: [−6 dB, 0 dB], [1 dB, 7 dB], [8 dB, 14 dB], and [15 dB, 21 dB]. Each signal-to-noise ratio range covers 6 dB, which exactly equals a signal-to-noise ratio gain of four times of retransmission. In this case, the user equipment needs to use 2 bits to transmit any one of four signal-to-noise ratio statuses (where each signal-to-noise ratio range represents one signal-to-noise ratio status). Each signal-to-noise ratio status exactly covers a signal-to-noise ratio area of four times of retransmission.

Alternatively, when a signal-to-noise ratio range for data transmission in the LTE-U system belongs to [−6 dB, 21 dB], the foregoing multiple signal-to-noise ratio ranges include the following three signal-to-noise ratio ranges: [−6 dB, 3 dB], [3 dB, 12 dB], and [12 dB, 21 dB]. Each signal-to-noise ratio range covers 9 dB, which equals a signal-to-noise ratio gain of eight times of retransmission. In this case, the user equipment needs to use 2 bits to transmit any one of three signal-to-noise ratio statuses (where each signal-to-noise ratio range represents one signal-to-noise ratio status). Each signal-to-noise ratio status exactly covers a signal-to-noise ratio area of eight times of retransmission.

Alternatively, when a channel signal-to-noise ratio range for data transmission in the LTE-U system belongs to [−6 dB, 21 dB], the foregoing multiple signal-to-noise ratio ranges include the following eight signal-to-noise ratio ranges: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB]. Each signal-to-noise ratio range covers 3 dB, which equals a signal-to-noise ratio gain of two times of retransmission. In this case, the user equipment needs to use 3 bits to transmit any one of eight signal-to-noise ratio statuses (where each signal-to-noise ratio range represents one signal-to-noise ratio status). Each signal-to-noise ratio status exactly covers a signal-to-noise ratio area of two times of retransmission.

Optionally, the modulation scheme indicator includes an indicator of any one of: quadrature phase shift keying QPSK, 16 quadrature amplitude modulation 16QAM, 64 quadrature amplitude modulation 64QAM, or 256 quadrature amplitude modulation 256QAM. In this case, the user equipment needs to use 2 bits to transmit any one of three 3 signal-to-noise ratio statuses. Each signal-to-noise ratio status covers one modulation and coding scheme.

When the CSI is a signal-to-noise ratio range indicator, for the second device, step 202 is specifically: selecting, by the second device according to a signal-to-noise ratio range indicated by the signal-to-noise ratio range indicator, a modulation and coding scheme (MCS) that corresponds to a maximum signal-to-noise ratio in the signal-to-noise ratio range, and sending the data to the first device according to the MCS.

The second device may retransmit, by means of a response, the data to the first device according to an MCS that corresponds to a signal-to-noise ratio point with a maximum signal-to-noise ratio in any one of the signal-to-noise ratio ranges. That is, after the second device sends the data to the first device for the first time according to the MCS that corresponds to the maximum signal-to-noise ratio point, if the second device can receive a response message of the first device and the response message indicates that the first device correctly receives the data, the second device does not send the data for the second time. If the second device does not receive a response message of the first device or the response message indicates that the first device fails to correctly receive the data, the second device initiates data sending to the first device for the second time according to the MCS that corresponds to the maximum signal-to-noise ratio point or another signal-to-noise ratio point (for example, a submaximal or a second maximum signal-to-noise ratio point), until the first device correctly receives the data. During the retransmission, if a channel changes, or interference changes very quickly, an excessively long delay affects a rapid response to a time-varying channel.

Therefore, step 202 may be further replaced by: selecting, by the second device according to the signal-to-noise ratio range indicated by the signal-to-noise ratio range indicator, the MCS that corresponds to the maximum signal-to-noise ratio in the signal-to-noise ratio range, and continuously sending the data to the first device according to the MCS for M times, where M is a positive integer. In this case, the MCS that corresponds to the signal-to-noise ratio point with the maximum signal-to-noise ratio in the signal-to-noise ratio range may be selected to encode the data. For example, if the channel state information fed back by the first device is a signal-to-noise ratio range [0, 6], the second device may continuously transmit a data packet according to an MCS that corresponds to a signal-to-noise ratio of 6, and continuously transmit the data packet for two times, so as to implement a quick match of data transmission for a channel. A specific value of M is not limited herein, and the value of M may be determined according to a range of the signal-to-noise ratio range. For details, refer to the foregoing embodiment, and M times of retransmission may include at least two times, four times, or eight times of retransmission.

In addition, optionally, the transmission interruption indicator may be out of range (OOR), which is used to indicate that the first device is currently in an OOR state. The OOR state indicates that the first device is subject to severe interference. In this case, the second device may interrupt the data transmission and stop transmitting the data to the first device on the unlicensed carrier.

Further optionally, for the second device, before the sending, by the second device, the data to the first device according to the CSI, no CSI can be referred to during the transmission of the data from the second device to the first device. Therefore, the following steps are provided in this embodiment of the present invention.

301: The second device averagely selects K signal-to-noise ratios in a target signal-to-noise ratio range, where K is a positive integer.

The target signal-to-noise ratio range is a channel signal-to-noise ratio range that is needed by the first device and the second device for data transmission. For example, in the LTE-U system, a maximum signal-to-noise ratio range [−6 dB, 21 dB] in the LTE-U system may be used as the target signal-to-noise ratio range.

302: The second device sends the data to the first device according to K modulation and coding schemes MCS that correspond to the K signal-to-noise ratios.

For example, if the second device uses four subframes to carry the data transmitted to the first device, K=4. In this case, four signal-to-noise ratio points of SINR (signal to interference plus noise ratio, signal-to-noise ratio)=0 dB, SINR=6 dB, SINR=12 dB, and SINR=18 dB may be used, and the data carried in the four subframes is sequentially encoded according to four MCSs that correspond to the four signal-to-noise ratio points. Certainly, other signal-to-noise ratio points may be used. When four signal-to-noise ratios are averagely selected, the signal-to-noise ratios are arranged in an arithmetic progression. In this way, data transmission performance is ensured even if the second device does not receive the CSI fed back by the first device.

Figure 7:
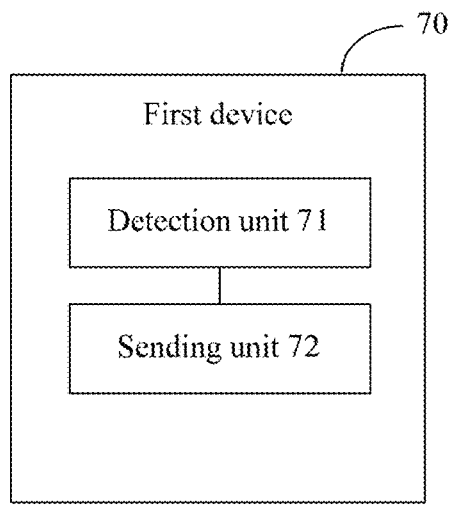
FIG. 7 is a schematic structural diagram of user equipment according to an embodiment of the present invention.

Referring to FIG. 7, an embodiment of the present invention provides a first device 70. The first device 70 is configured to implement the data transmission method performed by the first device in the foregoing embodiment, and includes a detection unit 71 and a sending unit 72.

The detection unit 71 is configured to detect data that is transmitted by a second device on an unlicensed carrier.

The sending unit 72 is configured to send channel state information CSI to the second device on an $N^{th}$ time resource that is after the detection unit 71 detects that the first device starts to receive the data that is transmitted by the second device on the unlicensed carrier, where N is a positive integer less than 4.

In foregoing embodiment, the first device detects data that is transmitted by a second device on an unlicensed carrier. The first device sends channel state information CSI to the second device on an $N^{th}$ time resource that is after the first device starts to receive the data that is transmitted by the second device on the unlicensed carrier, so that the second device sends the data to the first device according to the CSI fed back by the first device. This avoids signaling overheads of periodically sending the CSI by the first device, and can implement a real-time feedback of a CSI status.

Optionally, N is 1 or 2.

Optionally, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

Optionally, differences between their respective maximum signal-to-noise ratios and minimum signal-to-noise ratios of all the multiple signal-to-noise ratio ranges are equal.

Further, the multiple signal-to-noise ratio ranges are: [−6 dB, 0 dB], [1 dB, 7 dB], [8 dB, 14 dB], and [15 dB, 21 dB]; or the multiple signal-to-noise ratio ranges are: [−6 dB, 3 dB], [3 dB, 12 dB], and [12 dB, 21 dB]; or the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

Alternatively, optionally, the modulation scheme indicator includes an indicator of any one of: quadrature phase shift keying QPSK, 16 quadrature amplitude modulation 16QAM, 64 quadrature amplitude modulation 64QAM, or 256 quadrature amplitude modulation 256QAM.

Further, the foregoing first device is a base station or user equipment, or the foregoing second device is a base station or user equipment.

Figure 8:
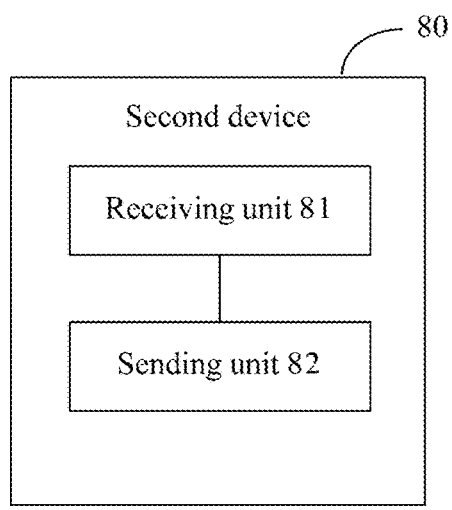
FIG. 8 is a schematic structural diagram of a base station according to an embodiment of the present invention.

Referring to FIG. 8, an embodiment of the present invention provides a second device 80. The second device 80 is configured to implement the data transmission method performed by the base station in the foregoing embodiment, and specifically includes a receiving unit 81 and a sending unit 82.

The receiving unit 81 is configured to receive, on an $N^{th}$ time resource that is after the second device starts to transmit data to a first device on an unlicensed carrier, channel state information CSI sent by the first device, where N is a positive integer less than 4.

The sending unit 82 is configured to send the data to the first device according to the CSI received by the receiving unit 81.

In foregoing embodiment, the second device receives, on an $N^{th}$ time resource that is after the second device starts to transmit data to a first device on an unlicensed carrier, channel state information CSI sent by the first device, and sends the data to the first device according to the CSI. This avoids signaling overheads of periodically sending the CSI by the first device, and can implement a real-time feedback of a CSI status.

Optionally, N is 1 or 2.

Optionally, the sending unit 82 is further configured to: averagely select K signal-to-noise ratios in a target signal-to-noise ratio range, where K is a positive integer; and send the data to the first device according to K modulation and coding schemes MCS that correspond to the K signal-to-noise ratios.

In this way, data transmission performance is ensured even if the second device does not receive the CSI fed back by the first device.

Optionally, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

When the CSI is a signal-to-noise ratio range indicator, the sending unit 82 is specifically configured to select, according to a signal-to-noise ratio range indicated by the signal-to-noise ratio range indicator, an MCS that corresponds to a maximum signal-to-noise ratio in the signal-to-noise ratio range, and send the data to the first device according to the MCS.

The sending unit 82 is further specifically configured to select, according to the signal-to-noise ratio range indicated by the signal-to-noise ratio range indicator, the MCS that corresponds to the maximum signal-to-noise ratio in the signal-to-noise ratio range, and continuously send the data to the first device according to the MCS for M times, where M is a positive integer.

Herein, the second device can implement a quick match of data transmission for a channel by continuously retransmitting the data to the first device for the M times.

Further, the first device is a base station or user equipment, or the second device is a base station or user equipment.

Figure 9:
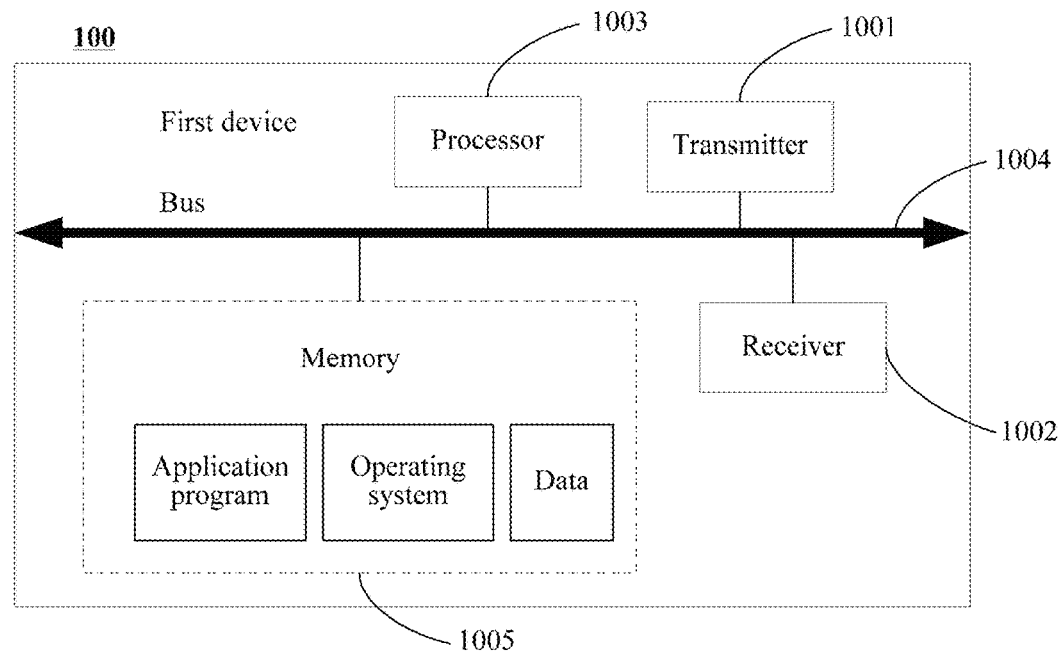
FIG. 9 is a schematic structural diagram of user equipment according to another embodiment of the present invention.

Referring to FIG. 9, an embodiment of the present invention provides a first device 100. The first device 100 is configured to implement the data transmission method performed by the first device in the foregoing embodiment, and includes a transmitter 1001, a receiver 1002, a processor 1003, and a bus 1004. The transmitter 1001, the receiver 1002, and the processor 1003 are connected by using the bus 1004 to implement mutual communication.

The bus 1004 may be an industry standard architecture (ISA) bus, a peripheral component interconnect (PCI) bus, or an extended industry standard architecture (EISA) bus, or the like, and is not limited herein. The bus 1004 may be classified into an address bus, a data bus, a control bus, and the like. For ease of description, the bus 1004 is represented in FIG. 9 by using only one bold line, but it does not indicate that there is only one bus or only one type of bus.

The processor 1003 may be a central processing unit (CPU), an application-specific integrated circuit (ASIC), or one or more integrated circuits configured to implement this embodiment of the present invention.

FIG. 9 further shows a memory 1005 connected to the bus 1004 and configured to store data or executable program code. The program code includes a computer operation instruction, and may be specifically: an operating system, an application program, or the like. The memory 1005 may include a high-speed random access memory (RAM) memory, and may further include a non-volatile memory, such as at least one magnetic disk memory.

The processor 1003 is configured to execute the program code in the memory 1005, to implement the data transmission method performed by the units in the foregoing embodiment. Specifically, the processor 1003 is configured to detect data that is transmitted by a second device on an unlicensed carrier; and the transmitter 1001 is configured to send channel state information CSI to the second device on an $N^{th}$ time resource that is after the processor 1003 detects that the receiver 1002 starts to receive the data that is transmitted by the second device on the unlicensed carrier.

In foregoing embodiment, a first device detects data that is transmitted by a second device on an unlicensed carrier. The first device sends channel state information CSI to the second device on an $N^{th}$ time resource that is after the first device starts to receive the data that is transmitted by the second device on the unlicensed carrier, so that the second device sends the data to the first device according to the CSI fed back by the first device. This avoids signaling overheads of periodically sending the CSI by the first device, and can implement a real-time feedback of a CSI status.

Optionally, N is 1 or 2.

Optionally, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges. Further, differences between their respective maximum signal-to-noise ratios and minimum signal-to-noise ratios of all the multiple signal-to-noise ratio ranges are equal.

Optionally, the multiple signal-to-noise ratio ranges are: [−6 dB, 0 dB], [1 dB, 7 dB], [8 dB, 14 dB], and [15 dB, 21 dB]; or the multiple signal-to-noise ratio ranges are: [−6 dB, 3 dB], [3 dB, 12 dB], and [12 dB, 21 dB]; or the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

Alternatively, optionally, the modulation scheme indicator includes an indicator of any one of: quadrature phase shift keying QPSK, 16 quadrature amplitude modulation 16QAM, 64 quadrature amplitude modulation 64QAM, or 256 quadrature amplitude modulation 256QAM.

Further, the first device is a base station or user equipment; or the second device is a base station or user equipment.

Figure 10:
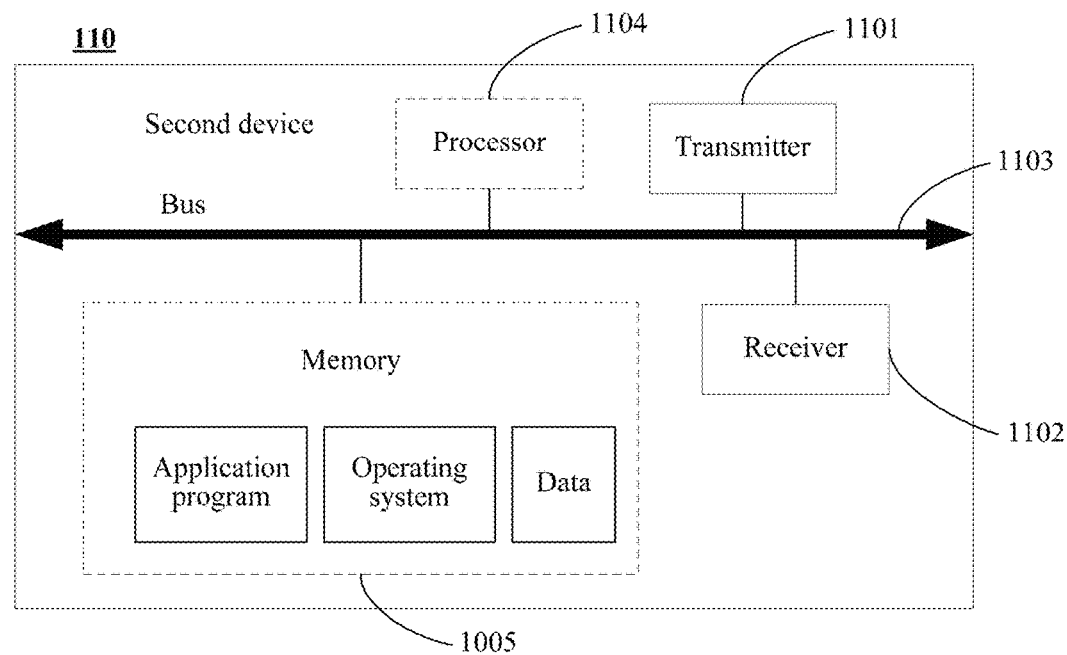
FIG. 10 is a schematic structural diagram of a base station according to another embodiment of the present invention.

Referring to FIG. 10, an embodiment of the present invention provides a second device. The second device is configured to implement the data transmission method performed by the second device in the foregoing embodiment, and includes a transmitter 1101, a receiver 1102, and a bus 1103. The transmitter 1101 and the receiver 1102 are connected by using the bus 1103 to implement mutual communication.

The bus 1103 may be an industry standard architecture (ISA) bus, a peripheral component interconnect (PCI) bus, or an extended industry standard architecture (EISA) bus, or the like, and is not limited herein. The bus 1103 may be classified into an address bus, a data bus, a control bus, and the like. For ease of description, the bus 1103 is represented in FIG. 10 by using only one bold line, but it does not indicate that there is only one bus or only one type of bus.

The receiver 1102 is configured to receive, on an $N^{th}$ time resource that is after the transmitter 1101 starts to transmit data to a first device on an unlicensed carrier, channel state information CSI sent by the first device, where N is a positive integer less than 4.

The transmitter 1101 is configured to send the data to the first device according to the CSI received by the receiver 1102.

In foregoing embodiment, the second device receives, on an $N^{th}$ time resource that is after the second device starts to transmit data to a first device on an unlicensed carrier, channel state information CSI sent by the first device, and sends the data to the first device according to the CSI. This avoids signaling overheads of periodically sending the CSI by the first device, and can implement a real-time feedback of a CSI status.

Optionally, N is 1 or 2.

Referring to FIG. 10, the base station further includes a processor 1104 connected to the bus 1103.

The processor 1104 may be a central processing unit (CPU), an application-specific integrated circuit (ASIC), or one or more integrated circuits configured to implement this embodiment of the present invention.

FIG. 10 further shows a memory 1105 connected to the bus 1103 and configured to store data or executable program code. The program code includes a computer operation instruction, and may be specifically: an operating system, an application program, or the like. The memory 1105 may include a high-speed RAM memory, and may further include a non-volatile memory (non-volatile memory), such as at least one magnetic disk memory.

The processor 1104 is configured to averagely select K signal-to-noise ratios in a target signal-to-noise ratio range, where K is a positive integer.

The transmitter 1101 is specifically configured to send the data to the first device according to K modulation and coding schemes MCS that correspond to the K signal-to-noise ratios selected by the processor 1104.

In this way, data transmission performance is ensured even if the second device does not receive the CSI fed back by the first device.

Optionally, the CSI includes: a transmission interruption indicator, a modulation scheme indicator, or a signal-to-noise ratio range indicator, where the transmission interruption indicator is used to instruct the second device to stop transmitting the data to the first device on the unlicensed carrier, the modulation scheme indicator is used to indicate a modulation scheme that is used by the second device to transmit the data to the first device, and the signal-to-noise ratio range indicator is used to indicate one of multiple signal-to-noise ratio ranges.

When the CSI is a signal-to-noise ratio range indicator, the transmitter 1101 is specifically configured to select, according to a signal-to-noise ratio range indicated by the signal-to-noise ratio range indicator, an MCS that corresponds to a maximum signal-to-noise ratio in the signal-to-noise ratio range, and send the data to the first device according to the MCS.

Alternatively, the transmitter 1101 is further specifically configured to select, according to the signal-to-noise ratio range indicated by the signal-to-noise ratio range indicator, the MCS that corresponds to the maximum signal-to-noise ratio in the signal-to-noise ratio range, and continuously send the data to the first device according to the MCS for M times, where M is a positive integer.

Herein, the second device can implement a quick match of data transmission for a channel by continuously retransmitting the data to the first device for the M times.

Further, the first device is a base station or user equipment; or the second device is a base station or user equipment.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A data transmission method comprising:
   detecting, by a first device, data in a data transmission from a second device on an unlicensed carrier; and
   sending, by the first device, channel state information (CSI) to the second device on an $N^{th}$ time resource that is a time resource after the first device starts receiving the data in the data transmission on the unlicensed carrier, wherein N is a positive integer less than 4, wherein the CSI comprises:
   a transmission interruption indicator for instructing the second device to stop transmitting the data to the first device on the unlicensed carrier;
   a modulation scheme indicator for indicating a modulation scheme that is used by the second device to transmit the data to the first device; or
   a signal-to-noise ratio range indicator for indicating one of multiple signal-to-noise ratio ranges, wherein differences between respective maximum signal-to-noise ratios and minimum signal-to-noise ratios of all the multiple signal-to-noise ratio ranges are equal.

2. The method according to claim 1, wherein:
   the multiple signal-to-noise ratio ranges are: [−6 dB, 0 dB], [1 dB, 7 dB], [8 dB, 14 dB], and [15 dB, 21 dB]; or
   the multiple signal-to-noise ratio ranges are: [−6 dB, 3 dB], [3 dB, 12 dB], and [12 dB, 21 dB]; or
   the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

3. The method according to claim 1, wherein the modulation scheme indicator comprises an indicator of any one of: quadrature phase shift keying (QPSK), 16 quadrature amplitude modulation (16QAM), 64 quadrature amplitude modulation (64QAM), or 256 quadrature amplitude modulation (256QAM).

4. The method according to claim 1, wherein N is 1 or 2.

5. A first device comprising:
   a transmitter, a receiver, a processor, and a bus, where the transmitter, the receiver, and the processor are connected via the bus for mutual communication;

the receiver configured to cooperate with the processor to receive data in a data transmission from a second device on an unlicensed carrier;

the processor configured to detect that the receiver starts to receive the data on the unlicensed carrier; and the transmitter configured to cooperate with the processor to send channel state information (CSI) to the second device on an $N^{th}$ time resource, wherein the $N^{th}$ time resource is a time resource after the processor detects that the receiver is receiving the data on the unlicensed carrier, wherein N is a positive integer less than 4, wherein the CSI comprises:

a transmission interruption indicator for instructing the second device to stop transmitting the data to the first device on the unlicensed carrier;

a modulation scheme indicator for indicating a modulation scheme that is used by the second device to transmit the data to the first device; or a signal-to-noise ratio range indicator for indicating one of multiple signal-to-noise ratio ranges, wherein differences between respective maximum signal-to-noise ratios and minimum signal-to-noise ratios of all the multiple signal-to-noise ratio ranges are equal.

6. The first device according to claim 5, wherein:

the multiple signal-to-noise ratio ranges are: [−6 dB, 0 dB], [1 dB, 7 dB], [8 dB, 14 dB], and [15 dB, 21 dB]; or the multiple signal-to-noise ratio ranges are: [−6 dB, 3 dB], [3 dB, 12 dB], and [12 dB, 21 dB]; or the multiple signal-to-noise ratio ranges are: [−6 dB, −3 dB], [−3 dB, 0 dB], [0 dB, 3 dB], [3 dB, 6 dB], [6 dB, 9 dB], [10 dB, 13 dB], [14 dB, 17 dB], and [18 dB, 21 dB].

7. The first device according to claim 5, wherein the modulation scheme indicator comprises an indicator of any one of: quadrature phase shift keying (QPSK), 16 quadrature amplitude modulation (16QAM), 64 quadrature amplitude modulation (64QAM), or 256 quadrature amplitude modulation (256QAM).

8. The first device according to claim 5, wherein N is 1 or 2.

9. The first device according to claim 5, wherein:

the first device is a base station or a user equipment; or the second device is a base station or a user equipment.

10. A second device comprising:

a processor;

a transmitter;

a receiver; and a bus, wherein the processor, the transmitter and the receiver are connected via the bus for mutual communication;

wherein the receiver is configured to cooperate with the processor to receive, on an $N^{th}$ time resource that is after the transmitter starts to transmit data to a first device on an unlicensed carrier, channel state information (CSI) sent by the first device, wherein N is a positive integer less than 4;

wherein the processor is configured to averagely select K signal-to-noise ratios in a target signal-to-noise ratio range, wherein K is a positive integer; and wherein the transmitter is configured to cooperate with the processor to send the data to the first device according to the CSI received by the receiver and according to K modulation and coding schemes (MCS) that correspond to the K signal-to-noise ratios selected by the processor.

11. The second device according to claim 10, wherein the CSI comprises:

a transmission interruption indicator instructing the second device to stop transmitting the data to the first device on the unlicensed carrier;

a modulation scheme indicator indicating a modulation scheme that is used by the second device to transmit the data to the first device; or a signal-to-noise ratio range indicator indicating one of multiple signal-to-noise ratio ranges.

12. The second device according to claim 11, wherein the CSI is a signal-to-noise ratio range indicator; and wherein the transmitter is further configured to cooperate with the processor to select, according to a signal-to-noise ratio range indicated by the signal-to-noise ratio range indicator, an MCS that corresponds to a maximum signal-to-noise ratio in the signal-to-noise ratio range, and send the data to the first device according to the MCS.

13. The second device according to claim 12, wherein the transmitter is further configured to cooperate with the processor to select, according to the signal-to-noise ratio range indicated by the signal-to-noise ratio range indicator, the MCS that corresponds to the maximum signal-to-noise ratio in the signal-to-noise ratio range, and continuously send the data to the first device according to the MCS for M times, wherein M is a positive integer.

14. The second device according to claim 10, wherein N is 1 or 2.

15. The second device according to claim 10, wherein:

the first device is a base station or a user equipment; or the second device is a base station or a user equipment.

* * * * *